(12) United States Patent
Liao

(10) Patent No.: US 10,864,854 B2
(45) Date of Patent: Dec. 15, 2020

(54) VEHICLE CAMERA DEVICE AND METHOD FOR SETTING THE SAME

(71) Applicant: GETAC TECHNOLOGY CORPORATION, Hsinchu County (TW)

(72) Inventor: Wu-Chieh Liao, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 96 days.

(21) Appl. No.: 16/043,471

(22) Filed: Jul. 24, 2018

(65) Prior Publication Data

US 2019/0202352 A1    Jul. 4, 2019

Related U.S. Application Data

(60) Provisional application No. 62/613,013, filed on Jan. 2, 2018.

(51) Int. Cl.
*B60R 1/00* (2006.01)
*B60W 10/30* (2006.01)

(52) U.S. Cl.
CPC ............. *B60R 1/00* (2013.01); *B60W 10/30* (2013.01); *B60R 2300/101* (2013.01); *B60R 2300/103* (2013.01); *B60R 2300/8093* (2013.01); *B60W 2420/403* (2013.01); *B60W 2554/801* (2020.02); *B60W 2555/20* (2020.02)

(58) Field of Classification Search
CPC ............. B60R 1/00; B60R 2300/101; B60R 2300/103; B60R 2300/8093; B60W 10/30; B60W 2420/403; B60W 2550/12; B60W 2550/308
See application file for complete search history.

(56) References Cited

U.S. PATENT DOCUMENTS

| | | | | |
|---|---|---|---|---|
| 6,281,632 B1* | 8/2001 | Stam | ............... | B60Q 1/1423 315/82 |
| 6,465,963 B1* | 10/2002 | Turnbull | ............... | B60C 23/061 307/10.8 |
| 2005/0075760 A1* | 4/2005 | Moisel | ............... | H04N 7/183 701/1 |
| 2013/0135478 A1* | 5/2013 | Kim | ............... | B60R 1/00 348/149 |
| 2014/0049973 A1* | 2/2014 | Adachi | ............... | B60Q 1/085 362/465 |
| 2015/0042226 A1* | 2/2015 | Hibino | ............... | B60Q 1/085 315/82 |
| 2017/0101056 A1* | 4/2017 | Park | ............... | B60Q 1/085 |
| 2017/0144587 A1* | 5/2017 | Ogawa | ............... | B60Q 1/0023 |

FOREIGN PATENT DOCUMENTS

| | | |
|---|---|---|
| CN | 105721762 A | 6/2016 |
| CN | 105959592 A | 9/2016 |

* cited by examiner

*Primary Examiner* — Jamie M Holliday (57) ABSTRACT

A vehicle camera device is suitable to be provided in a first vehicle. The vehicle camera device receives a distance between the first vehicle and a second vehicle, detects the environment brightness information, and generates an angle value and a power value according to the distance and the environment brightness information, so as to adjust an angle of depression and a power of an infrared illumination module according to the angle value and the power value.

13 Claims, 5 Drawing Sheets

VEHICLE CAMERA DEVICE AND METHOD FOR SETTING THE SAME

CROSS-REFERENCE TO RELATED APPLICATIONS

This application claims the benefit of U.S. Application No. 62/613,013, filed on Jan. 2, 2018, the entire disclosure of which is hereby incorporated by reference.

BACKGROUND OF THE INVENTION

Field of the Invention

The invention relates to a camera technology and, more particularly, to a vehicle camera device and a method for setting the same.

Description of the Prior Art

Most people rely on vehicles as a means of transport in the daily lives, such that the number of vehicles continues to rise year after year and vehicles have become an indispensable means of transport in the modern world. Due to unpredictable road conditions, most vehicles are equipped with vehicle camera devices for capturing images of road conditions or vehicles ahead.

A current vehicle camera device is commonly provided with an infrared illumination module to facilitate image capturing in a low-illuminance environment. However, an infrared illumination module is substantially constantly illuminating so as to enable a camera device to capture an image of a fast moving object by using a short shutter speed. As a result, an infrared illumination module usually suffers from poor heat dissipation or over-exposure. Furthermore, the durability of such infrared illumination module is also decreased.

SUMMARY OF THE INVENTION

A method for setting a vehicle camera device is provided according to an embodiment of the present invention. The method, suitable to be applied to a first vehicle, includes: receiving a distance between the first vehicle and a second vehicle, detecting the environment brightness information, generating an angle value and a power value according to the distance and the environment brightness information, and adjusting an angle of depression and a power of an infrared illumination module according to the angle value and the power value.

A vehicle camera device is provided according to an embodiment of the present invention. The vehicle camera device is suitable to be applied in a first vehicle, and includes a vehicle distance sensor, an environment brightness module, a processing module and an infrared illumination module. The vehicle distance sensor senses a distance between the first vehicle and a second vehicle. The environment brightness module generates the environment brightness information. The processing module generates an angle value and a power value according to the distance and the environment brightness information. The infrared illumination module adjusts an angle of depression and a power of an infrared lamp according to the angle value and the power value.

A vehicle camera device is provided according to an embodiment of the present invention. The vehicle camera device is suitable to be applied in a first vehicle, and includes a vehicle distance sensor, a timing module, a processing module and an infrared illumination module. The vehicle distance sensor senses a distance between the first vehicle and a second vehicle. The timing module generates a current time. The processing module compares the current time with a time threshold to obtain a time analysis result, obtains the environment brightness information according to the time analysis result, and generates an angle value and a power value according to the distance and the environment brightness information. The infrared illumination module adjusts an angle of depression and a power of the infrared illumination module according to the angle value and the power value.

In conclusion, the vehicle camera device and the method for setting the vehicle camera device according to the embodiments of the present invention are suitable to be applied to a vehicle, and the angle of depression and the power of the infrared illumination module can be adjusted in response to a distance to a vehicle ahead and the environment brightness, enabling a camera module to obtain an appropriate image quality and thus a clear image.

DETAILED DESCRIPTION OF THE EMBODIMENTS

For clear description, ordinal terms such as "first", "second" and "third" are for distinguishing an element, a region and a part from another identical or similar element, region and part, and are not to be construed as limiting a specific element, region or part.

Figure 1:
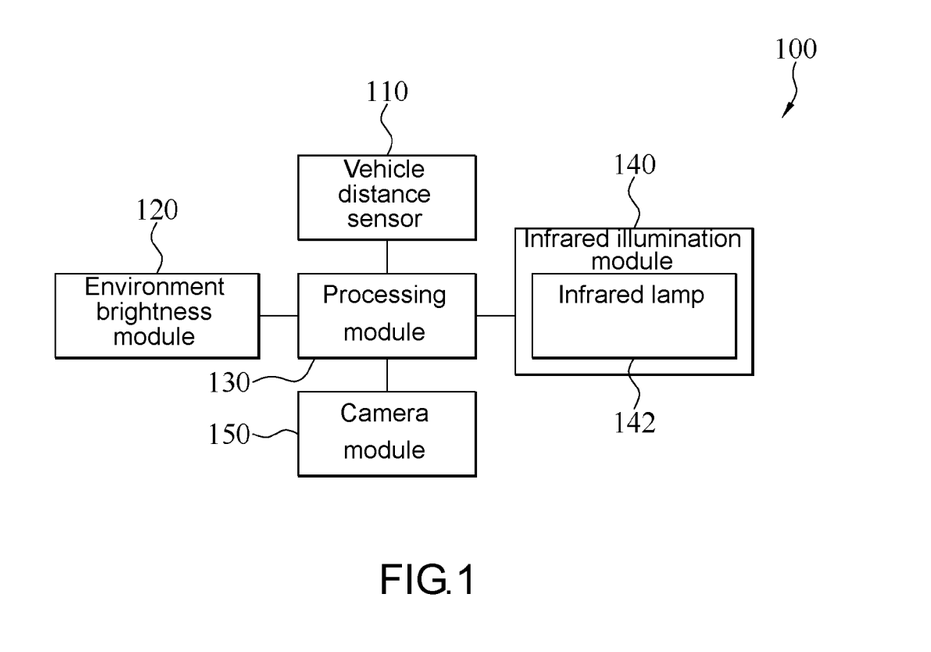
FIG. 1 is a circuit block diagram of a vehicle camera device according to an embodiment of the present invention.

FIG. 1 shows a circuit block diagram of a vehicle camera device according to an embodiment of the present invention. Referring to FIG. 1, a vehicle camera device 100 is suitable to be applied in a vehicle (hereinafter referred to as a "first vehicle"). In some embodiments, the vehicle camera device 100 can be mounted in a first vehicle and capture a scene ahead of the first vehicle, wherein the scene includes a second vehicle located ahead of the first vehicle.

The vehicle camera device 100 includes a vehicle distance sensor 110, an environment brightness module 120, a processing module 130 and an infrared illumination module 140. The vehicle distance sensor 110, the environment brightness module 120 and the infrared illumination module 140 are signally connected to the processing module 130, respectively.

The vehicle distance sensor 110 senses a distance between the first vehicle and the second vehicle. In one embodiment, the vehicle distance sensor 110 senses a relative distance between a vehicle head of the first vehicle and a vehicle tail of the second vehicle. In one embodiment, the vehicle distance sensor 110 may be an infrared transmitter, an infrared distance sensor, an ultrasonic sensor or a combination of the above.

The environment brightness module 120 detects the brightness of the environment light of the scene ahead of the first vehicle to generate the environment brightness information.

The processing module 130 receives the sensed distance between the first vehicle and the second vehicle from the vehicle distance sensor 110 and the environment brightness information from the environment brightness module 120, and generates an angle value and a power value according to the distance and the environment brightness information. In one embodiment, the processing module 130 may be a microprocessor, microcontroller, a digital signal processor, a central processing unit, or any analog and/or digital device that operates a signal on the basis of an operation instruction.

The infrared illumination module 140 adjusts an angle of depression of the infrared lamp 142 according to the angle value and adjusts the power of the infrared lamp 142 according to the power value.

In one embodiment, the vehicle camera device 100 may further include a camera module 150 that captures the scene ahead of the first vehicle to generate a driving-vehicle image.

In one embodiment, the vehicle distance sensor 110, the environment brightness module 120, the processing module 130 and the infrared illumination module 140 may be integrated in the same camera system, for example, a camera device equipped with the infrared lamp 142, a sensor apparatus sensing the environment brightness, and/or a sensor apparatus sensing a vehicle distance.

In another embodiment, the environment brightness module 120, the processing module 130 and the infrared illumination module 140 may be integrated in the same camera system, and the vehicle distance sensor 110 may be provided in the first vehicle and is signally connected to the camera system.

Figure 2:
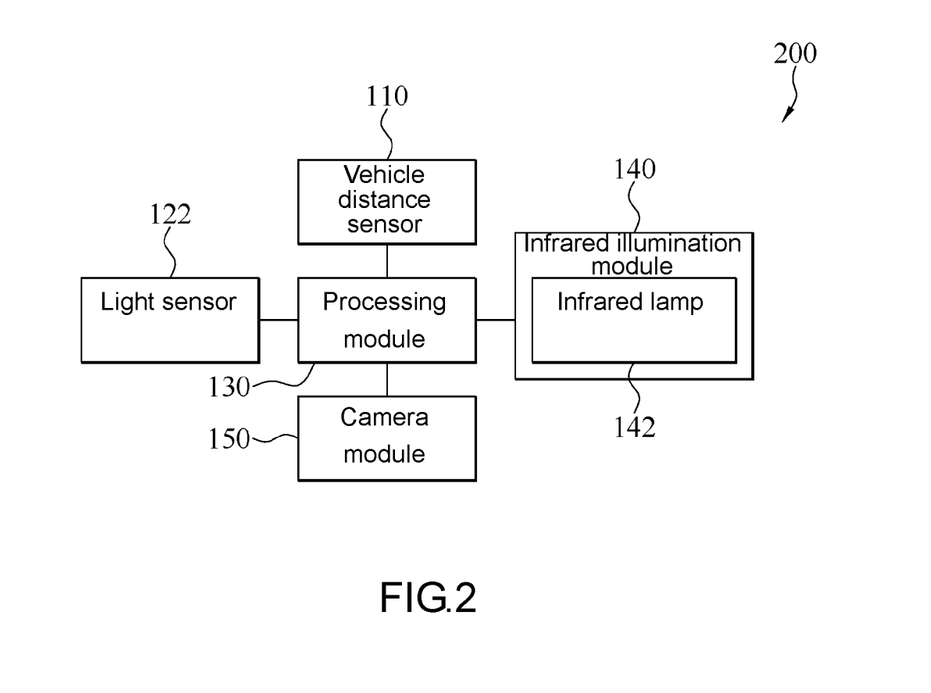
FIG. 2 is a circuit block diagram of a vehicle camera device according to another embodiment of the present invention.

FIG. 2 shows a circuit block diagram of a vehicle camera device according to another embodiment of the present invention. In the vehicle camera device 200, the environment brightness module 120 may be a light senor 122 for sensing the environment brightness of a scene ahead of the first vehicle.

Figure 3:
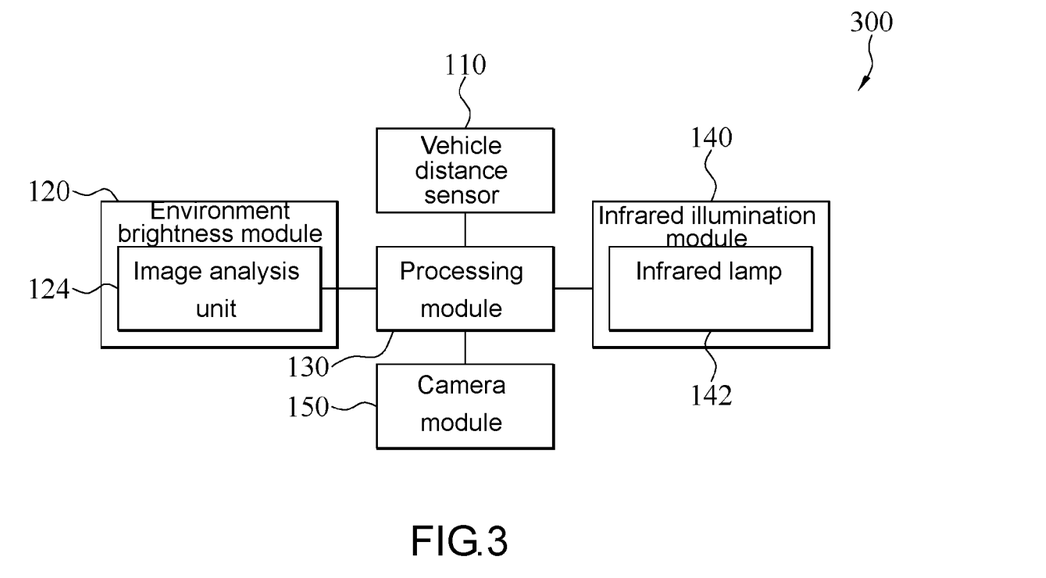
FIG. 3 is a circuit block diagram of a vehicle camera device according to another embodiment of the present invention.

FIG. 3 shows a circuit block diagram of a vehicle camera device according to another embodiment of the present invention. In the vehicle camera device 300, the environment brightness module 120 may include an image analysis unit 124. When the camera module 150 captures the scene ahead of the first vehicle to generate a driving-vehicle image, the image analysis unit 124 receives the driving-vehicle image through the processing module 130, performs image recognition on the driving-vehicle image to obtain an exposure value (EV) of the driving-vehicle image, and converts the exposure value to the environment brightness information. In one embodiment, the image analysis unit 124 may be an image signal processing (ISP) chip.

Figure 4:
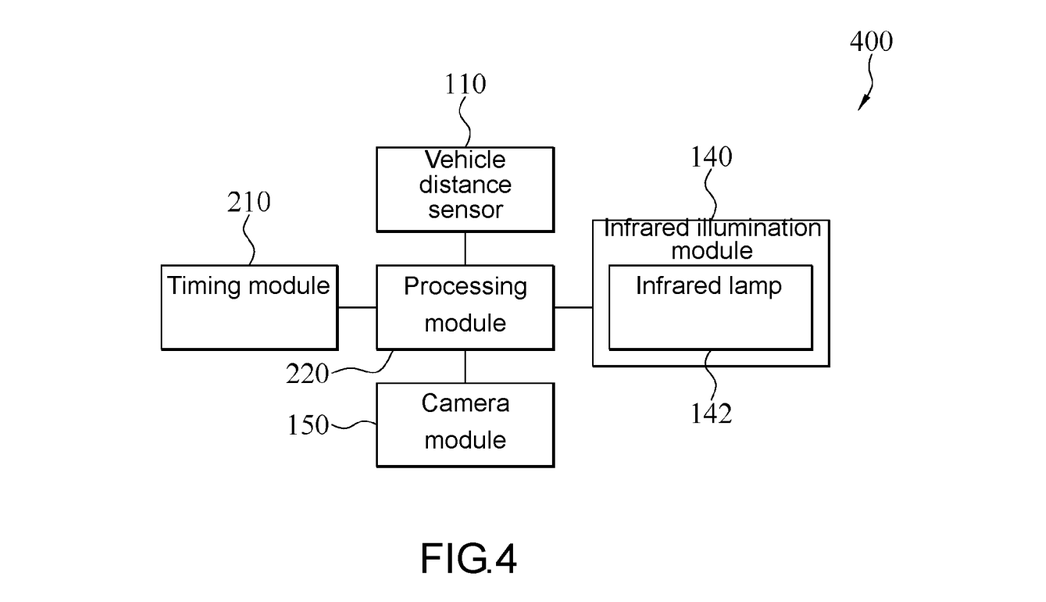
FIG. 4 a circuit block diagram of a vehicle camera device according to yet another embodiment of the present invention.

FIG. 4 shows a circuit block diagram of a vehicle camera device according to yet another embodiment of the present invention. The vehicle camera device 400 includes a vehicle distance sensor 110, a timing module 210, a processing module 220 and an infrared illumination module 140. The vehicle distance sensor 110, the timing module 210 and the infrared illumination module 140 are signally connected to the processing module 130, respectively. The connection relationships of the vehicle distance sensor 110 and the infrared illumination module 140 are substantially identical to those in the foregoing embodiment, and associated details are omitted herein.

The timing module 210 generates a current time. In one embodiment, the current time may include the hour, minute, date, month and year, or a part of the above (e.g., including the hour, minute and date). In one embodiment, the timing module 210 may be a timer.

The processing module 220 compares the current time with a time threshold to obtain a time analysis result, and obtains the environment brightness information according to the time analysis result. The processing module 220 receives the sensed distance between the first vehicle and the second vehicle from the vehicle distance sensor 110, and generates an angle value and a power value according to the distance and the environment brightness information.

In one embodiment, the vehicle distance sensor 110, the timing module 210, the processing module 220 and the infrared illumination module 140 may be integrated in the same camera system, e.g., a camera device equipped with the infrared lamp 142, a timer, a sensor apparatus for sensing environment brightness, and a sensor apparatus for sensing a vehicle distance.

In another embodiment, the timing module 210, the processing module 220 and the infrared illumination module 140 may be integrated in the same camera system, and the vehicle distance sensor 110 may be additionally provided in the first vehicle and signally connected to the camera system.

Figure 5:
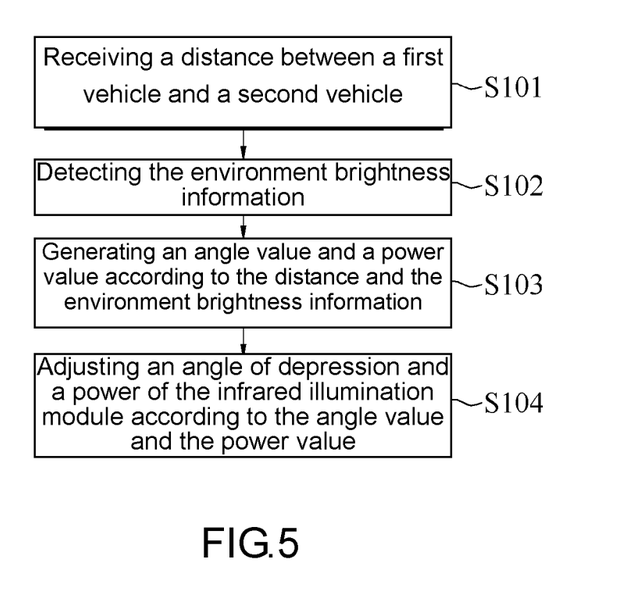
FIG. 5 is a flowchart of a method for setting a vehicle camera device according to an embodiment of the present invention.

FIG. 5 shows a flowchart of a method for setting a vehicle camera device according to an embodiment of the present invention. Referring to FIG. 5, a method for setting a vehicle camera device includes receiving a distance between a first vehicle and a second vehicle (step S101), detecting the environment brightness information (step S102), generating an angle value and a power value according to the distance and the environment brightness information (step S103), and adjusting an angle of depression and a power of the infrared illumination module 140 according to the angle value and the power value (step S104).

In step S101, the processing module 130 receives the distance between the first vehicle (a current vehicle) and the second vehicle. The distance between the first vehicle and the second vehicle may be sensed by the vehicle distance sensor 110 at this point. In one embodiment, the distance between the first vehicle and the second vehicle may be a relative distance between a vehicle head of the first vehicle and a vehicle tail of the second vehicle.

In step S102, the environment brightness module 120 detects the environment brightness information. In one embodiment, the environment brightness module 120 detects the brightness of the environment light of a scene ahead of the first vehicle to generate the environment brightness information.

In step S103, the processing module 130 receives the environment brightness information from the environment brightness module 120, and generates an angle value and a power value according to the distance between the first vehicle and the second vehicle and the environment brightness information. In one embodiment, the distance, the environment brightness information, the angle value and the power value may be recorded in a look-up table (LUT). Table-1 shows an example of the LUT according to an embodiment.

TABLE 1

| Environment brightness information (EV) | Distance (m) | Angle value (°) | Power value (W) |
|---|---|---|---|
| EV1 | 5 | 45 | 30 |
| EV2 | 5.5 | 45 | 35 |
| . | . | . | . |
| . | . | . | . |
| . | . | . | . |
| EV10 | 10 | 30 | 100 |
| . | . | . | . |
| . | . | . | . |
| . | . | . | . |
| EV19 | 15 | 25 | 150 |
| EV20 | 20 | 20 | 200 |

Taking the LUT in Table-1 for instance, when the image analysis unit 124 performs image recognition on the driving-vehicle image to obtain the exposure value EV1 of the driving-vehicle image and the vehicle distance sensor 110 senses that the distance between the first vehicle and the second vehicle is 5 m, the processing module 130 generates an angle value (i.e., an angle of depression of the infrared lamp 142) of 45° and a power value of 30 W. When the image analysis unit 124 performs image recognition on the driving-vehicle image to obtain the exposure value EV20 of the driving-vehicle image and the vehicle distance sensor 110 senses that the distance between the first vehicle and the second vehicle is 20 m, the processing module 130 generates an angle value (i.e., an angle of depression of the infrared lamp 142) of 20° and a power value of 200 W.

Thus, as known from Table-1, when the environment brightness value detected is the environment brightness information having a lower value in the LUT and the sensed distance is a shorter distance in the LUT, the angle value generated by the processing module 130 is a larger angle (i.e., the angle of depression of the infrared lamp 142 is larger, and low beam lights are provided) and the power value generated by the processing module 130 is a smaller power (i.e., the brightness of the infrared lamp 142 is lower). When the environment brightness value detected is the environment brightness information having a higher value in the LUT and the sensed distance is a longer distance in the LUT, the angle value generated by the processing module 130 is a smaller angle (i.e., the angle of depression of the infrared lamp 142 is smaller, and high beam lights are provided) and the power value generated by the processing module 130 is a larger power (i.e., the brightness of the infrared lamp 142 is higher).

In step S104, the infrared illumination module 140 receives the angle value and the power value, adjusts the angle of depression of the infrared lamp 142 according to the angle value, and adjusts the power of the infrared lamp 142 of the infrared illumination module 140 according to the power value.

Figure 6:
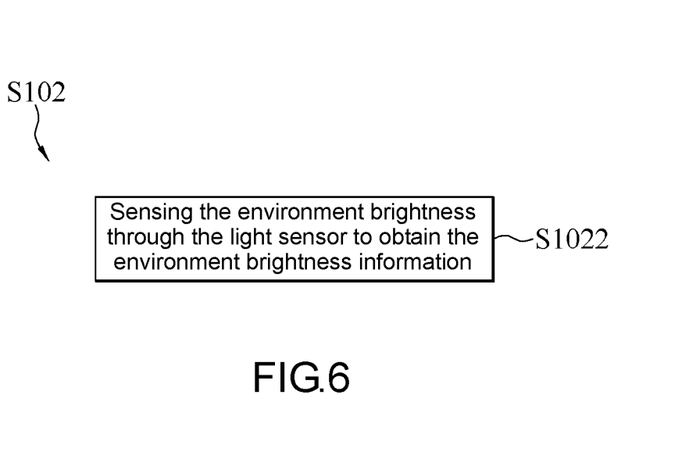
FIG. 6 is a flowchart of step S102 according to an embodiment of the present invention.

Furthermore, there are numerous ways to detect the environment brightness information (step S102). FIG. 6 shows a flowchart of step S102 according to an embodiment of the present invention. Steps S101, S103 and S104 are substantially identical to those described above, and associated details are omitted herein. Referring to FIG. 6 as well as FIG. 2, in this embodiment, the environment brightness module 120 may be the light sensor 122 for sensing the environment brightness of a scene ahead of the first vehicle. The detection of the environment brightness information (step S102) may be sensing the environment brightness through the light sensor 122 to obtain the environment brightness information (S1022).

Figure 7:
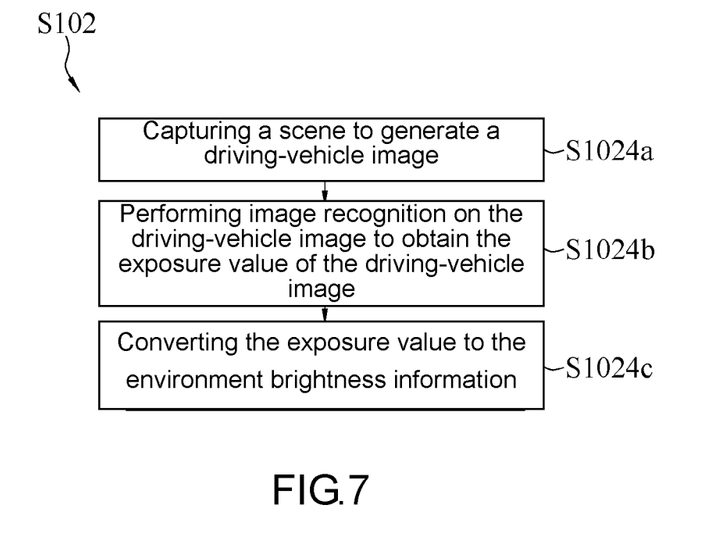
FIG. 7 is a flowchart of step S102 according to another embodiment of the present invention.

FIG. 7 shows a flowchart of step S102 according to another embodiment of the present invention. Steps S101, S103 and S104 are substantially identical to those described above, and associated details are omitted herein. Referring to FIG. 7 as well as FIG. 3, in this embodiment, the environment brightness module 120 may include the camera module 150 and the image analysis unit 124. The detection of the environment brightness information (step S102) may include capturing a scene to generate a driving-vehicle image (step S1024a), performing image recognition on the driving-vehicle image to obtain the exposure value of the driving-vehicle image (step S1024b), and converting the exposure value to the environment brightness information (step S1024c).

In step S1024a, the camera module 150 captures a scene ahead of the first vehicle to generate a driving-vehicle image.

In step S1024b, the image analysis unit 124 receives the driving-vehicle image, performs image recognition on the driving-vehicle image to obtain an exposure value of the driving-vehicle image, and converts the exposure value to the environment brightness information.

In step S1024c, the image analysis unit 124 converts the exposure value to the environment brightness information. In one embodiment, the image analysis unit 124 may include a microprocessor that may convert the exposure value to the environment brightness information.

Figure 8:
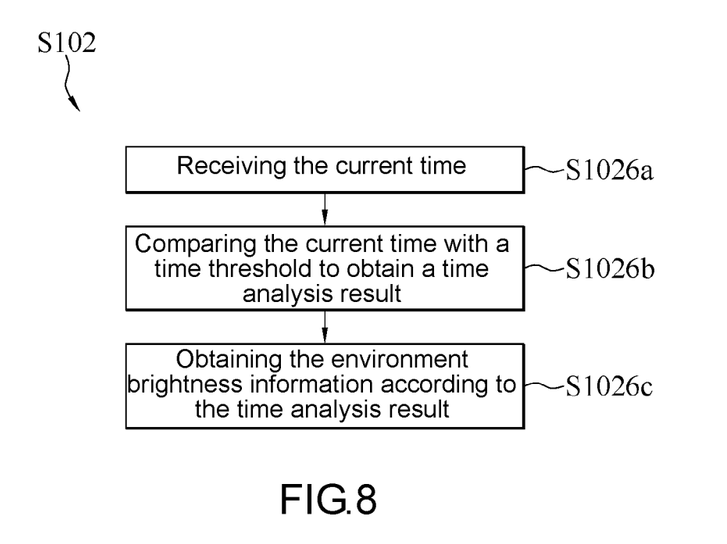
FIG. 8 is a flowchart of step S102 according to yet another embodiment of the present invention.

FIG. 8 shows a flowchart of step S102 according to yet another embodiment of the present invention. Steps S101, S103 and S104 are substantially identical to those described above, and associated details are omitted herein. Referring to FIG. 8 as well as FIG. 4, in this embodiment, the vehicle camera device 200 includes the vehicle distance sensor 110, the timing module 210, the processing module 220 and the infrared illumination module 140. The detection of the environment brightness information (step S102) may include receiving the current time (step S1026a), comparing the current time with a time threshold to obtain a time analysis result (step S1026b), and obtaining the environment brightness information according to the time analysis result (step S1026c).

In step S1026a, the timing module 210 generates a current time, and transmits the current time to the processing module 220. The current time refers to a current time point.

In step S1026b, the processing module 220 compares the current time with a time threshold to obtain a time analysis result. In one embodiment, the time threshold may include one or more time thresholds, e.g., a single time threshold, a combination of two time thresholds, or a combination of more than three time thresholds. In one embodiment, when the time threshold includes a combination of a first time threshold, a second time threshold and a third time threshold, the time analysis result may be a determination result indicating that the current time is within an interval formed between the first time threshold and the second time threshold, a determination result indicating that the current time is within an interval formed between the second time threshold and the third time threshold, or a determination result indicating that the current time is within an interval formed between the third time threshold and the first time threshold.

In step S1026c, the processing module 220 obtains the environment brightness information according to the time analysis result. In one embodiment, the first time threshold is 6:00 in the morning (6:00 am), the second time threshold is 12:00 at noon (12:00 pm), and the third time threshold is 5:00 in the afternoon (5:00 pm). When the current time is within an interval formed between the first time threshold and the second time threshold, i.e., the current time is in the morning and is between 6:00 in the morning (6:00 am) and 12:00 at noon (12:00 pm), the processing module 220 selects a first brightness level as the environment brightness information. When the current time is within an interval formed between the second time threshold and the third time threshold, i.e., the current time is at noon and is between 12:00 at noon (12:00 pm) and 5:00 in the afternoon (5:00 pm), the processing module 220 selects a second brightness level as the environment brightness information. When the current time is within an interval formed between the third time threshold and the first time threshold, i.e., the current time is in the evening/at night and is between 5:00 in the afternoon (5:00 pm) and 6:00 in the morning (6:00 am), the processing module 220 selects a third brightness level as the environment brightness information. In general weather conditions, the environment brightness at noon is greater than the environment brightness in the morning, and the environment brightness in the morning is greater than the environment brightness in the evening/at night. Therefore, the second brightness level is greater than the first brightness level, and the first brightness level is greater than the third brightness level. However, the above time points of the first time threshold, the second time threshold and the third time threshold and the corresponding time analysis results are for illustrations only, and may be modified according to different requirements.

Figure 9:
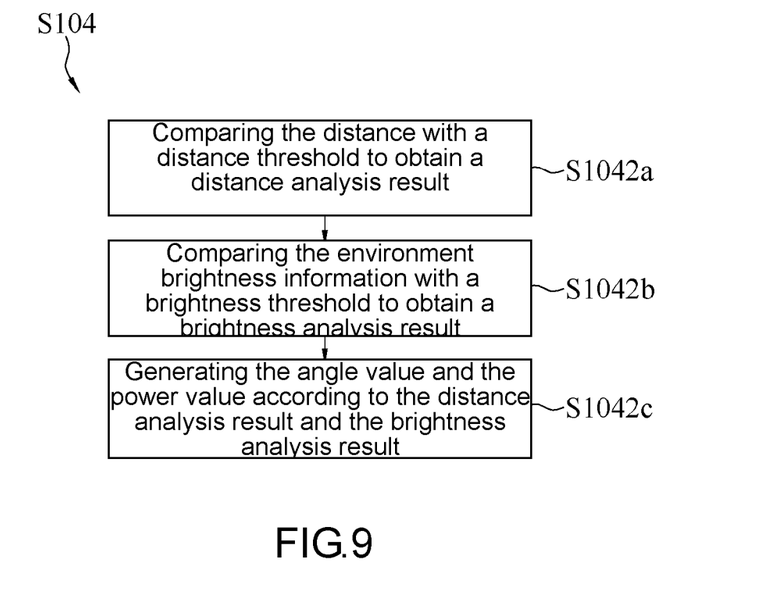
FIG. 9 is a flowchart of step S104 according to an embodiment of the present invention.

FIG. 9 shows a flowchart of step S104 according to an embodiment of the present invention. Steps S101 to S103 are substantially identical to those described above, and associated details are omitted herein. Referring to FIG. 9, in this embodiment, adjusting the angle of depression and the power of the infrared illumination module 140 according to the angle value and the power value (step S104) may include comparing the distance with a distance threshold to obtain a distance analysis result (step S1042a), comparing the environment brightness information with a brightness threshold to obtain a brightness analysis result (step S1042b), and generating the angle value and the power value according to the distance analysis result and the brightness analysis result (step S1042c).

In step S1042a, after receiving the distance between the first vehicle (a current vehicle) and the second vehicle from the vehicle distance sensor 110, the processing module 130 compares the distance with a distance threshold to obtain the distance analysis result. In one embodiment, the distance threshold may include one or more thresholds, e.g., a single distance threshold, a combination of two distance thresholds, or a combination of more than three distance thresholds. In one embodiment, when the distance threshold is a single distance threshold, the distance analysis result may be a distance smaller than the distance threshold or a distance greater than the distance threshold.

In step S1042b, after receiving the generated environment brightness information from the environment brightness module 120, the processing module 130 compares the environment brightness information with a brightness threshold to obtain the brightness analysis result. In one embodiment, the brightness threshold may include one or more brightness thresholds, e.g., a single brightness threshold, a combination of two brightness thresholds, or a combination of more than three brightness thresholds. In one embodiment, when the brightness threshold is a single brightness threshold, the brightness analysis result may be the environment brightness information smaller than the brightness threshold or the environment brightness information greater than the brightness threshold.

In step S1042c, the processing module 130 generates an angle value and a power value according to the distance and the environment brightness information. In other words, the distance analysis result and the brightness analysis result are associated with a set of angle value and power value.

In one example, when the distance analysis result obtained by the processing module 130 indicates that the distance is smaller than the distance threshold, and/or the brightness analysis result indicates that the environment brightness information is greater than the brightness threshold, the angle value generated by the processing module 130 may be in a larger value (i.e., the angle of depression of the infrared lamp 142 is larger, and low beam lights are provided) and/or the power value is a smaller power (i.e., the brightness of the infrared lamp 142 is lower).

In an example, when the distance analysis result obtained by the processing module 130 indicates that the distance is smaller than the distance threshold, and/or the brightness analysis result indicates that the environment brightness information is greater than the brightness threshold, the angle value generated by the processing module 130 may be smaller (i.e., the angle of depression of the infrared lamp 142 is smaller, and high beam lights are provided) and/or the power value is a larger power (i.e., the brightness of the infrared lamp 142 is higher).

In conclusion, the vehicle camera device and the method for setting the vehicle camera device according to the embodiments of the present invention are suitable to be applied to a vehicle, and the angle of depression and power of an infrared illumination module can be adjusted in response to a distance to a vehicle ahead and the environment brightness.

While the invention has been described by way of example and in terms of the preferred embodiments, it is to be understood that the invention is not limited thereto. Various modifications and changes made by a person skilled in the art without departing from the spirit of the present invention are to be encompassed within the scope of the present invention. The scope of the present invention therefore should be accorded with the broadest interpretation of the appended claims.

What is claimed is:

1. A method for setting a vehicle camera device, suitable to be applied to a first vehicle, the method for setting a vehicle camera device comprising:
   receiving a distance between the first vehicle and a second vehicle;
   detecting environment brightness information;
   generating an angle value and a power value according to the distance and the environment brightness information; and
   adjusting an angle of depression and a power of an infrared illumination module according to the angle value and the power value;
   wherein the step of generating the angle value and the power value according to the distance and the environment brightness information comprises:
   comparing the distance with a distance threshold to obtain a distance analysis result;
   comparing the environment brightness information and a brightness threshold to obtain a brightness analysis result; and generating the angle value and the power value according to the distance analysis result and the brightness analysis result; and wherein upon the distance being smaller than the distance threshold and/or the brightness analysis result indicating that the environment brightness information is greater than the brightness threshold, the angle value is increased and the power value is decreased.

2. The method for setting a vehicle camera device according to claim 1, wherein the step of detecting the environment brightness information obtains the environment brightness information through a light sensor sensing the environment brightness.

3. The method for setting a vehicle camera device according to claim 1, wherein the step of detecting the environment brightness information comprises:
capturing a scene to generate a driving-vehicle image;
performing image recognition on the driving-vehicle image to obtain an exposure value of the driving-vehicle image; and
converting the exposure value to the environment brightness information.

4. The method for setting a vehicle camera device according to claim 1, wherein the step of detecting the environment brightness information comprises:
receiving a current time;
comparing the current time with a time threshold to obtain a time analysis result; and
obtaining the environment brightness information according to the time analysis result.

5. The method for setting a vehicle camera device according to claim 4, wherein the time threshold comprises a first time threshold, a second time threshold and a third time threshold, and the step of obtaining the environment brightness information according to the time analysis result comprises:
selecting a first brightness level as the environment brightness information when the current time is between the first time threshold and the second time threshold;
selecting a second brightness level as the environment brightness information when the current time is between the second time threshold and the third time threshold; and
selecting a third brightness level as the environment brightness information when the current time is between the third time threshold and the first time threshold;
wherein the second brightness level is greater than the first brightness level, and the first brightness level is greater than the third brightness level.

6. The method for setting a vehicle camera device according to claim 1, wherein upon the distance being greater than the distance threshold and/or the brightness analysis result indicating that the environment brightness information is smaller than the brightness threshold, the angle value is decreased or the power value is increased.

7. The method for setting a vehicle camera device according to claim 1, wherein the infrared illumination module is provided with a single infrared lamp, and adjustments to the angle of depression and power of the infrared illumination module are made to this single infrared lamp.

8. A vehicle camera device, suitable to be provided in a first vehicle, the vehicle camera device comprising:
a vehicle distance sensor, sensing a distance between the first vehicle and a second vehicle;
an environment brightness module, generating the environment brightness information;
a processing module, generating an angle value and a power value according to the distance and the environment brightness information; and
an infrared illumination module, adjusting an angle of depression and a power of an infrared lamp according to the angle value and the power value,
wherein when the distance is smaller than a distance threshold and/or the environment brightness information is greater than a brightness threshold, the angle value generated by the processing module is increased and the power value is decreased, and when the distance is greater than a distance threshold and/or the environment brightness information is smaller than a brightness threshold, the angle value generated by the processing module is decreased and the power value is increased.

9. The vehicle camera device according to claim 8, wherein the environment brightness module is a light sensor that senses the environment brightness to obtain the environment brightness information.

10. The vehicle camera device according to claim 8, further comprising:
a camera module, capturing a scene to generate a driving-vehicle image;
wherein the environment brightness module comprises an image analysis unit, and the image analysis unit performs image recognition on the driving-vehicle image to obtain an exposure value of the driving-vehicle image and converts the exposure value to the environment brightness information.

11. The vehicle camera device according to claim 8, wherein when the distance is greater than a distance threshold and/or the environment brightness information is smaller than a brightness threshold, the angle value generated by the processing module is decreased or the power value is increased.

12. The vehicle camera device according to claim 8, wherein the infrared illumination module is provided with a single infrared lamp, and adjustments to the angle of depression and power of the infrared illumination module are made to this single infrared lamp.

13. A method for setting a vehicle camera device, suitable to be applied to a first vehicle, the method for setting a vehicle camera device comprising:
receiving a distance between the first vehicle and a second vehicle;
detecting environment brightness information;
generating an angle value and a power value according to the distance and the environment brightness information; and
adjusting an angle of depression and a power of an infrared illumination module according to the angle value and the power value;
wherein the step of generating the angle value and the power value according to the distance and the environment brightness information comprises:
comparing the distance with a distance threshold to obtain a distance analysis result;
comparing the environment brightness information and a brightness threshold to obtain a brightness analysis result; and
generating the angle value and the power value according to the distance analysis result and the brightness analysis result; and wherein upon the distance being greater than the distance threshold and/or the brightness analysis result indicating that the environment brightness information is smaller than the brightness threshold, the angle value is decreased and the power value is increased.

\* \* \* \* \*